US006736897B2

(12) United States Patent
Jensen

(10) Patent No.: US 6,736,897 B2
(45) Date of Patent: May 18, 2004

(54) WURSTER AIR DIVERTER SLEEVE

(75) Inventor: Brian K. Jensen, Cedar Rapids, IA (US)

(73) Assignee: Vector Corporation, Marion, IA (US)

( * ) Notice: Subject to any disclaimer, the term of this patent is extended or adjusted under 35 U.S.C. 154(b) by 0 days.

(21) Appl. No.: 10/268,583

(22) Filed: Oct. 10, 2002

(65) Prior Publication Data

US 2003/0154917 A1 Aug. 21, 2003

Related U.S. Application Data

(62) Division of application No. 10/079,009, filed on Feb. 19, 2002, now Pat. No. 6,685,775.

(51) Int. Cl.[7] .............................. B05C 5/00; B05D 1/00

(52) U.S. Cl. ..................... 118/303; 118/DIG. 5; 118/62

(58) Field of Search ........................... 118/303, DIG. 5, 118/62; 427/185, 213; 239/424

(56) References Cited

U.S. PATENT DOCUMENTS 3,940,514 A * 2/1976 Baker et al. .................. 118/62

* cited by examiner

*Primary Examiner*—J. A. Lorengo
*Assistant Examiner*—Yewebdar Tadesse
(74) *Attorney, Agent, or Firm*—McKee, Voorhees & Sease, P.L.C.

(57) ABSTRACT

The improved Wurster of the present invention includes an air diverter which supplies a flow of air in a radial direction adjacent the spray nozzle body and spray nozzle, so as to force the product away from the nozzle during the spraying process. The air diverter includes a sleeve with air passages therein, a manifold connected to the sleeve and to a source of secondary pressurized air or gas, and a collar to mount the assembled air diverter onto the perforated plate of the Wurster apparatus. In operation, the air diverter allows the spray pattern from the nozzle to more fully develop, allows more complete atomization of the spray solution, and allows for higher spray rates with little or no agglomeration of the product.

8 Claims, 3 Drawing Sheets

WURSTER AIR DIVERTER SLEEVE

This is a divisional of application Ser. No. 10/079,009, filed Feb. 19, 2002, now U.S. Pat. No. 6,685,775.

BACKGROUND OF THE INVENTION

The well-known Wurster apparatus and process for coating particulate material in a fluidized bed relies upon an air stream for moving and suspending the product (such as granules, beads, pellets, tablets) during coating, layerings, and drying. The Wurster apparatus generally includes a container with a cylindrical partition extending upwardly therein, and with a perforated plate or screen at the lower end thereof to define a bottom wall for the particles. The partition is spaced above the perforated plate. The area within the cylindrical partition defines the upbed of the container, while the area outside the partition defines the downbed of the container. The perforated plate includes an area of large perforations and a greater percentage of perforated open area through which air flows into the upbed at an increased velocity, and an area of perforations with a lower percentage of open area through which air flows into the downbed at a decreased velocity. The higher velocity air in the upbed area transports the particles for coating, layering, and drying of a coating solution sprayed from a spray nozzle extending upwardly through the perforated plate and into the upbed area. The particles then encounter the lower velocity air in the expansion chamber above the partition. When the air velocity is insufficient to support the product, the particles fall into the downbed area for reentry into the higher velocity air, such that a cycle of coating in the upbed area and drying in the downbed area is achieved. Various forms of the Wurster apparatus and process are disclosed in U.S. Pat. Nos. 2,648,609, 2,799,241, 3,089,824, 3,196,827, 3,207,824, and 3,253,944.

In the conventional Wurster apparatus, the material passes closely to the spray nozzle. The close proximity of the material to the spray nozzle prevents complete development of the spray pattern, produces incomplete atomization, and can result in agglomeration of the material at modest spray rates. Uneven or non-uniform coating of the material also results from the close passage of the material to the spray nozzle as the material is carried upwardly in the upbed area of the Wurster container.

Therefore, a primary objective of the present invention is the provision of an improved Wurster having an air diverter for improving the coating process.

Another objective of the present invention is the provision of an air diverter for a Wurster apparatus that allows more complete development of the spray pattern and more complete atomization of the spray solution.

A further objective of the present invention is the provision of an improved Wurster, which eliminates or minimizes agglomeration of the material as it is sprayed.

Another objective of the present invention is the provision of a sleeve mounted on the spray nozzle and connected to a gas or air line to supply air through holes in the sleeves and to expel the air in a radial direction adjacent the nozzle so as to move material laterally away from the nozzle during the spraying operation.

Another objective of the present invention is the provision of an improved Wurster wherein the volume of air and air pressure passing through the diverter can be monitored and controlled to enhance performance of the Wurster as the product grows in size throughout the coating process.

A further objective of the present invention is the provision of an improved Wurster process having a primary flow of air to carry the material in a cyclical path through the upbed and downbed areas of the Wurster container, and a secondary flow of air adjacent the spray nozzle to move the product away from the nozzle during spraying.

Another objective of the invention is the provision of an improved Wurster having increased spray rate due to the improved product flow characteristics within the spray zone.

A further objective of the present invention is the provision of an air diverter for a Wurster having various shaped sleeves and/or multiple columns.

These and other objectives will become apparent from the following description of the invention.

SUMMARY OF THE INVENTION

The improved Wurster apparatus of the present invention includes an air diverter for moving products away from the spray nozzle during the spraying process. More particularly, the air diverter comprises a sleeve extending around the spray nozzle body and having a plurality of holes adjacent the spray nozzle. The sleeve is operatively connected to a pressurized air line which forces air outwardly through the holes in the sleeve in a circumferential direction. The force generated by the velocity of the expelled air or gas pushes the material away from the nozzle, while the volume of the expelled air or gas prevents the material from collapsing back inwardly around the nozzle until the material is past the spray zone. The air diverter increases the effective area of the spray zone to allow the spray pattern to develop more fully, and to allow higher spray rates with little or no agglomeration of the product.

In the improved Wurster process of the present invention, a primary air flow is directed into the upbed and downbed areas of the Wurster container in a conventional manner so as to cycle the product upwardly through the upbed area for coating and/or layering, and downwardly through the downbed area for re-introduction to the spray zone. The process improvement includes a secondary air flow directed radially outwardly adjacent the spray nozzle to move and maintain the product in a spaced relation to the spray nozzle for more fully developed spray pattern, increased spray rates, and elimination or minimization of agglomeration of the coated material.

DETAILED DESCRIPTION OF THE INVENTION

Figure 1:
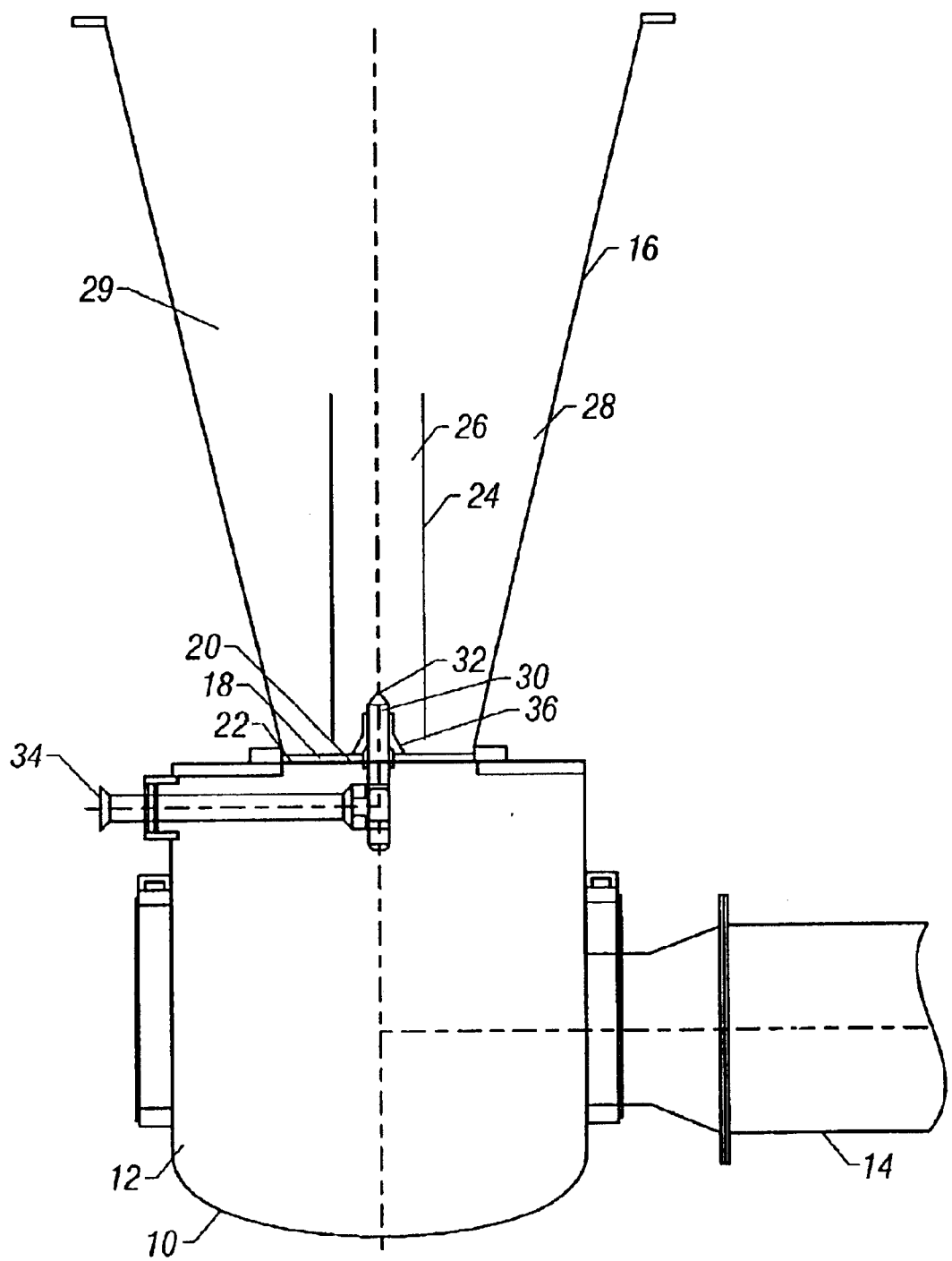
FIG. 1 is a sectional side elevation view of the improved Wurster apparatus of the present invention.
Figure 2:
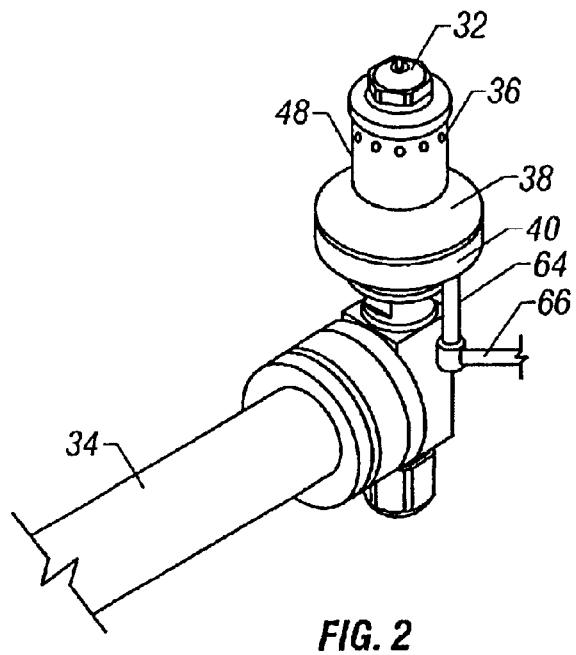
FIG. 2 is a perspective view of the air diverter of the present invention.

With reference to FIG. 1, the Wurster apparatus 10 includes an inlet air plenum 12. An air inlet duct 14 extends from a primary air source (not shown) into the plenum 12. A conically or straight sided container 16 extends upwardly from the plenum 12. It is understood that the Wurster 10 may include multiple columns extending upwardly from the plenum 12. For example, there may be a conical outer container 16 and a cylindrical inner container (not shown). For clarity, the drawings only show a single container 16.

A perforated plate or screen 18 resides between the plenum 12 and the container 10 or 16, and includes a central portion 20 having large diameter openings and a larger percentage open area, and a perimeter portion 22 having smaller diameter openings in a smaller percentile open area. A cylindrical partition 24 is centrally mounted in the container 16 so as to define a central upbed area 26 of the container 10 or 16 with a surrounding downbed area 28. An expansion area 29 is defined by the space above the partition 24. A spray nozzle body 30 extends through the plate 18 into the upbed area 26 of the container 16. A spray nozzle 32 is provided at the end of the sprayer 30. The spray nozzle body 30 and spray nozzle 32 are operatively connected to a source of coating solution (not shown) via a fluid line 34.

The above description of the Wurster apparatus is conventional and does not constitute part of the present invention.

The present invention is directed towards an air diverter 36 mounted on the spray nozzle body 30 to provide a flow of pressurized air or gas in a circumferentially outwardly direction relative to the spray nozzle 32. More particularly, the air diverter 36 includes a sleeve 38, a manifold 40, and a collar 42 assembled together and mounted on the spray nozzle body 30. The sleeve 38 is in the form of a hollow tubular member, with a lower end or base 44 and an upper end 46. A plurality of holes 48 extend through the tubular sleeve member 38 adjacent the upper end 46 thereof. The upper end 46 of the sleeve 38 includes an internal groove 50 adapted to receive a sealing member, such as an O ring 52. Similarly, the base 44 of the sleeve 48 includes an internal groove 54 adapted to receive a sealing member, such as O ring 56. The base 44 of the sleeve 38 includes one or more passageways 58.

Figure 3:
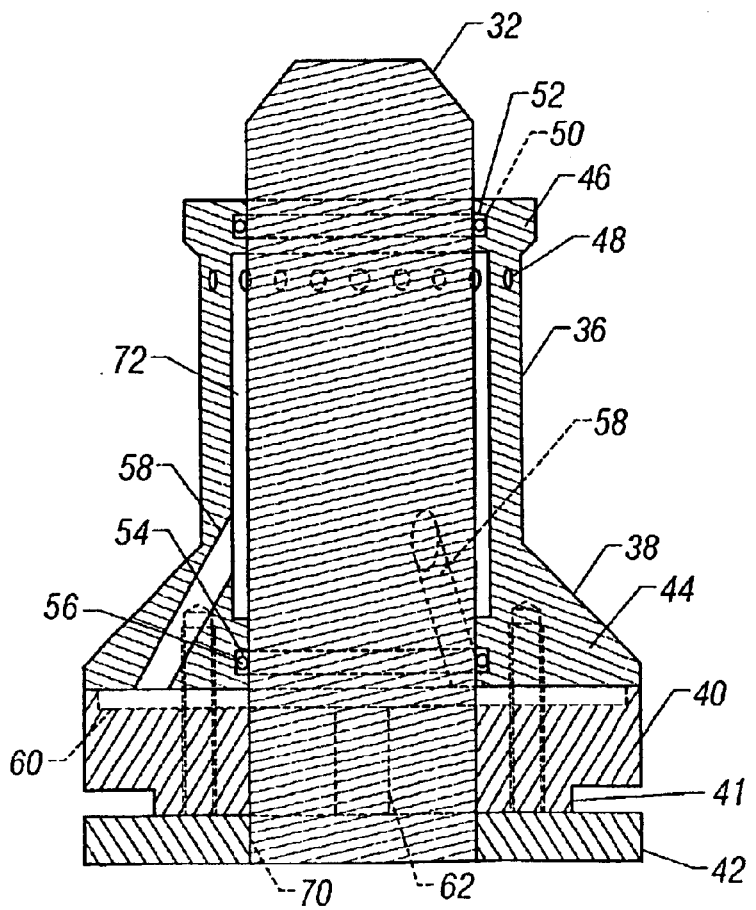
FIG. 3 is a sectional view of the air diverter of the present invention mounted over the spray nozzle.
Figure 4:
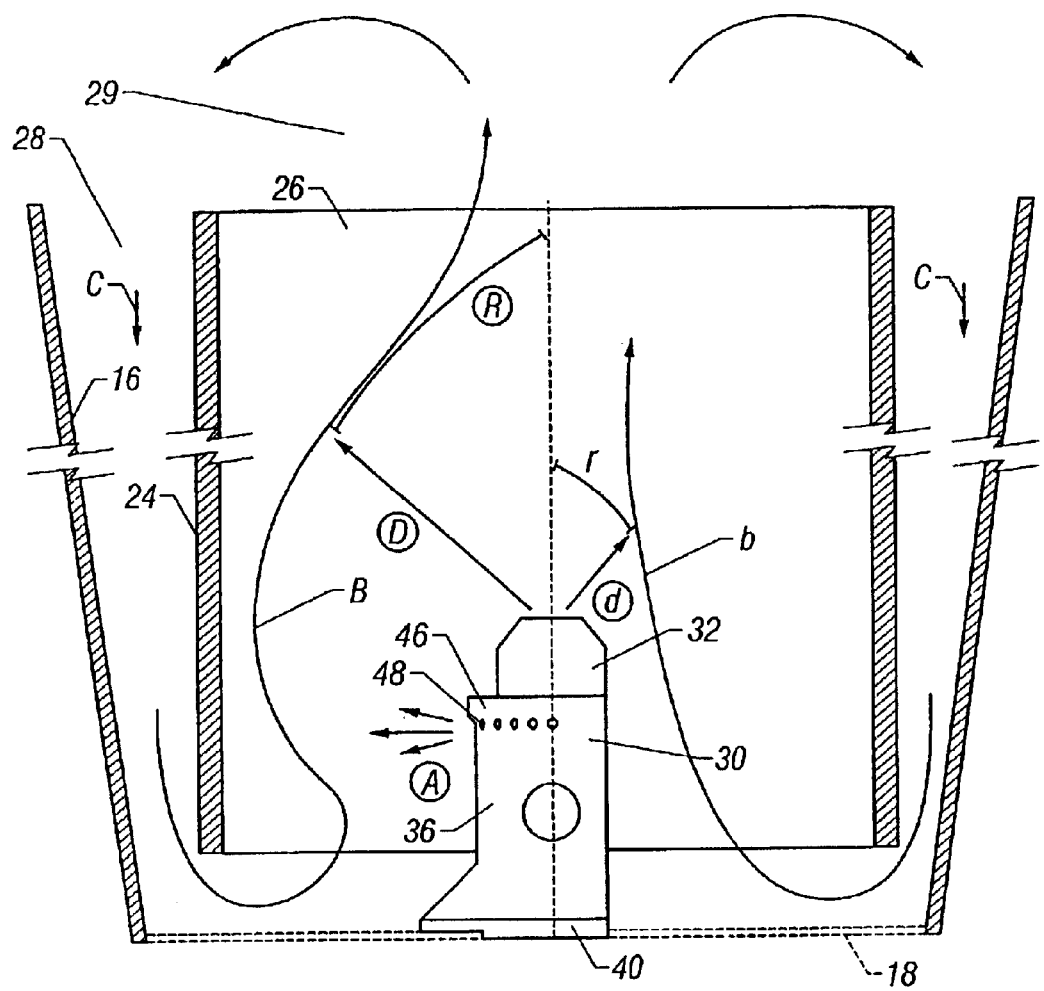
FIG. 4 is a sectional side elevation view of a Wurster comparing the cyclical flow path of the product with and without the air diverter of the present invention (left and right sides of the figure respectively).
Figure 5:
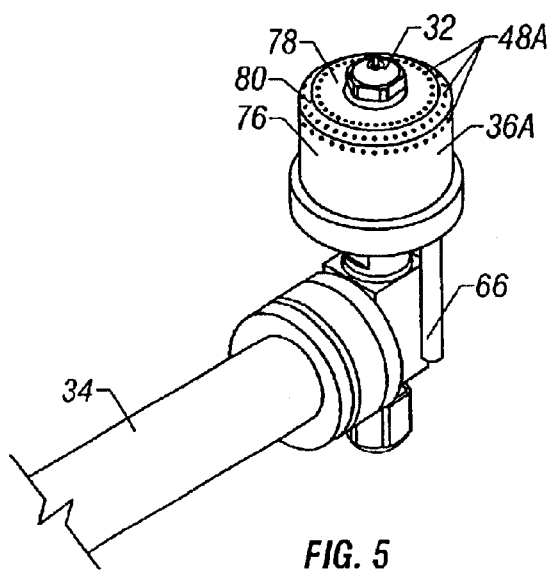
FIG. 5 is a perspective view similar to FIG. 2 showing an alternative embodiment of an air diverter according to the present invention.

The manifold 40 is mounted to the base 44 of the sleeve 38 using screws or other fasteners. The manifold 40 includes an upper surface with a circumferentially extending groove 60. An enlarged aperture 62 extends through the manifold 40 and is adapted to receive a fitting 64 connected to a secondary air line 66, which in turn, is connected to a source of pressurized air or gas (not shown). The bottom of the manifold 40 includes a projection or lip 41 adapted to be received within a central opening in the perforated plate 18, such that the perforated plate is sandwiched between the manifold 40 and the collar 42, as best seen in FIGS. 3 and 4. The collar 42 is screwed or otherwise fastened to the manifold 40, and includes an enlarged aperture 70 through which the fitting 64 extends.

When the air diverter 36 is assembled on the spray nozzle body 30, an internal tubular or cylindrical air chamber 72 is formed by the internal wall of the sleeve 38 and the external wall of the spray nozzle body 30, as best seen in FIG. 3. The O rings 52, 56 seal the upper and lower ends of the air chamber 72.

The left side of FIG. 4 shows the product path using the air diverter 36, while the right side of FIG. 4 shows the product path without using the air diverter 36. In use, the pressurized air or gas from the primary air source is supplied through the primary air duct 14 for passage through the perforations of the plate 18, in a conventional manner. Pressurized air or gas from the secondary air source flows through the secondary air line 66 and the fitting 64, around the circumferential groove 60 of the manifold 40, and then through the air passages 58 in the sleeve 38 into the air chamber 72. The air is forced outwardly through the holes 48 of the sleeve 38 in a circumferential direction relative to the spray nozzle 32, as represented by the arrows A on the left side of FIG. 4. The velocity of the expelled air or gas moves the product away from the spray nozzle 32, as represented by the arrow B in FIG. 4. The volume of the expelled air or gas prevents the material from collapsing back inwardly towards the spray nozzle 32 until the material has moved upwardly in the upbed area 26 out of the spray zone of the nozzle 32, as shown by arrow B in FIG. 4. As the coated product moves into the expansion area 29 above the partition 24, the product encounters lower velocity air which allows the product to move downwardly in the downbed area 28, as designated by arrow C in FIG. 4. The product is then drawn beneath the partition 24 by the high velocity air passing through the upbed area 26. Thus, there is a cycle of coating in the upbed area 26 and drying in the downbed area 28. The air diverter 36 creates a distance D (FIG. 4) from the spray nozzle 32 to the product, thereby defining an increased spray area, as designated by the radius R on the left side of FIG. 4.

In the absence of the air diverter 36 with the radially directed air from the secondary air supply, the product moves in a conventional path adjacent the spray nozzle 32, as shown by arrows b and c in FIG. 4. Without the air diverter 36, the distance d between the nozzle 32 and the product is relatively small, thereby producing a small spray area as represented by the radius "r" on the right side of FIG. 4.

FIG. 5 shows an alternative embodiment of an air diverter 36A for use with a Wurster apparatus. The air diverter 36A includes a body 74 with a vertical side wall 76, a horizontal top surface 78, and a beveled edge 80 at the juncture of the side wall 76 and top surface 78. A plurality of holes 48A extend circumferentially around the air diverter 36A in the side wall 76, the top surface 78, and the beveled edge 80. The air diverter 36A extends around the spray nozzle body 30, such that the spray nozzle 32 extends above the top surface 78 of the air diverter 36A. The air diverter 36A is connected to the secondary air supply line 66 and includes appropriate seals so that the pressurized air or gas from the supply line 66 is forced outwardly through the holes 48A to create the increased spray area, as discussed above with respect to the air diverter 36.

The volume and pressure of the air or gas from the diverters 36, 36A can be easily controlled and monitored through valves and gauges.

Accordingly, the improved Wurster and improved Wurster process of the present invention provides more complete development of the spray pattern from the spray nozzle 32, more complete atomization of the spray solution from the spray nozzle 32, and elimination or minimization of product agglomeration. Therefore, the present invention accomplishes at least all of the stated objectives.

Whereas the invention has been shown and described in connection with the preferred embodiment thereof, it will be understood that any modifications, substitutions, and additions may be made which are within the intended broad scope of the following claims. From the foregoing, it can be seen that the present invention accomplishes at least all of the stated objectives.

What is claimed is:

1. An air diverter for a Wurster product coating apparatus having a spray nozzle body with a spray nozzle positioned in a container for coating the product with a sprayed solution, the device comprising:
- a sleeve positioned adjacent the nozzle and having a plurality of holes therein directed away from the spray nozzle;
- an air line operatively connected to the sleeve to force air through the holes in a radial direction so as to move the product laterally away from the spray nozzle.

2. The air diverter of claim 1 wherein the sleeve includes upper and lower ends, and the air diverter further comprising a manifold attached to the lower end of the sleeve, the holes being in the upper end of the sleeve and the air line being attached to the manifold.

3. The air diverter of claim 1 wherein the sleeve includes air passages providing communication between the holes and the air line.

4. The air diverter of claim 1 wherein the sleeve has upper and lower ends, the holes being spaced circumferentially around the sleeve adjacent the upper end.

5. An air diverter for a Wurster apparatus having a spray nozzle extending into an upbed zone, comprising:
- a sleeve extending around the nozzle and having holes extending approximately perpendicular to a spray axis of the spray nozzle to direct air outwardly away from the nozzle.

6. The air diverter of claim 5 further comprising an air line connected to the sleeve to supply air to the sleeve.

7. The air diverter of claim 6 wherein a manifold connects the air line to the sleeve.

8. The air diverter of claim 5 wherein the holes extend circumferentially around the sleeve.

\* \* \* \* \*